US012693482B2

(12) United States Patent
Lee

(10) Patent No.: US 12,693,482 B2
(45) Date of Patent: Jul. 28, 2026

(54) SEALING STRUCTURE FOR OPTOELECTRONIC TRANSCEIVER DEVICE

(71) Applicant: AIP Inc., New Taipei City (TW)

(72) Inventor: Chia Lee, New Taipei City (TW)

( * ) Notice: Subject to any disclaimer, the term of this patent is extended or adjusted under 35 U.S.C. 154(b) by 295 days.

(21) Appl. No.: 18/595,501

(22) Filed: Mar. 5, 2024

(65) Prior Publication Data

US 2025/0035867 A1     Jan. 30, 2025

Related U.S. Application Data

(63) Continuation-in-part of application No. 18/510,668, filed on Nov. 16, 2023.

(60) Provisional application No. 63/617,447, filed on Jan. 4, 2024, provisional application No. 63/528,933, filed on Jul. 26, 2023.

(51) Int. Cl.
*G02B 6/42*          (2006.01)

(52) U.S. Cl.
CPC ......... *G02B 6/4251* (2013.01); *G02B 6/4246* (2013.01); *G02B 6/4268* (2013.01)

(58) Field of Classification Search
None
See application file for complete search history.

(56) References Cited

U.S. PATENT DOCUMENTS

| | | | |
|---|---|---|---|
| 6,798,954 B2 | 9/2004 | Carpenter et al. | |
| 9,995,889 B2 | 6/2018 | Yoda et al. | |
| 11,218,242 B2 | 1/2022 | Nagarajan et al. | |
| 11,777,631 B2 | 10/2023 | Nagarajan et al. | |
| 2012/0027364 A1* | 2/2012 | Tamura | G02B 6/4292 385/88 |
| 2015/0192745 A1 | 7/2015 | Yamazaki et al. | |
| 2022/0350089 A1 | 11/2022 | Puffer et al. | |
| 2024/0069287 A1 | 2/2024 | Adivarahan et al. | |

FOREIGN PATENT DOCUMENTS

| | | |
|---|---|---|
| CN | 104765104 A | 7/2015 |
| CN | 106104344 B | 11/2017 |
| CN | 113759475 A | 12/2021 |
| TW | I222956 B | 11/2004 |
| TW | 202246821 A | 12/2022 |

* cited by examiner

*Primary Examiner* — Michael Stahl

(57) ABSTRACT

A sealing structure for an optoelectronic transceiver device includes a first casing, a second casing, and a sealing element. The optoelectronic transceiver device is arranged between the first casing and the second casing. At least a notch portion is arranged between peripheral portions of the first casing and the second casing. The sealing element includes at least a retaining block positioned in the notch portion and encompassing a part of an optical fiber assembly, which is included in the optoelectronic transceiver device and extends out of the notch portion.

21 Claims, 15 Drawing Sheets

SEALING STRUCTURE FOR OPTOELECTRONIC TRANSCEIVER DEVICE

CROSS REFERENCE TO RELATED APPLICATIONS

This application claims the benefit of U.S. provisional patent application Ser. No. 63/528,933, filed Jul. 26, 2023, U.S. patent application Ser. No. 18/510,668, filed Nov. 16, 2023, and U.S. provisional patent application Ser. No. 63/617,447, filed Jan. 4, 2024, the entireties of which are incorporated by reference herein.

BACKGROUND OF INVENTION

1. Field of Invention

The present invention relates to a technical field of optoelectronic device, and particularly to a sealing structure for an optoelectronic transceiver device used in an immersion cooling system.

2. Related Art

Optoelectronic integrated circuits (OEICs), using photons instead of electrons for calculation and data transmission in integrated circuits, bring great benefits to the development of industries requiring high-performance data exchange, long-distance interconnection, 5G facilities, and computing equipment. OEICs are configured with photonic integrated circuits (PICs) and electronic integrated circuits (EICs) and are generally co-packaged as co-packaged optics (CPO). These days, CPO modules are extensively used in servers. As is known, servers generate a great deal of heat energy during operation. To avoid poor operational performance, circuit boards in the servers are immersed in heat dissipation liquid of cooling containers to absorb heat energy generated by electronic components. Such a heat exchange manner requires a large amount of heat dissipation liquid or fluid coolant that is susceptible to leakage during use. Unfortunately, there is no mature or effective solution for solving this problem.

SUMMARY OF INVENTION

An object of the present application is to provide a sealing structure for an optoelectronic transceiver device used in an immersion cooling system to effectively protect the optoelectronic transceiver device from damage caused by permeation or leakage of cooling liquids.

To achieve the above-mentioned objects, one aspect of the present application is to provide a sealing structure for an optoelectronic transceiver device, the optoelectronic transceiver device including a main board, a load board disposed on the main board, a processing unit disposed on the load board, and at least an optical fiber assembly connected to the processing unit. The sealing structure includes a first casing, a second casing, and a sealing element. The second casing is disposed on the load board and assembled with the first casing such that a part of the optical fiber assembly and the processing unit are arranged between the first casing and the second casing. At least a notch portion is arranged between peripheral portions of the first casing and the second casing. The sealing element includes at least a retaining block positioned in the notch portion and encompassing a part of the optical fiber assembly extending out of the notch portion.

Optionally, the first casing includes a first cover portion covering the part of the optical fiber assembly and the processing unit, and the sealing element further includes a first sealing strip with a sealing block disposed on the first sealing strip. The first sealing strip is arranged on peripheries of the first cover portion facing the second casing, and the sealing block has a thickness greater than a thickness of the first sealing strip and is disposed against the retaining block in the notch portion.

Optionally, the sealing block includes a pair of first tab portions extending outward from opposite sides of the first sealing strip to fit against the notch portion.

Optionally, the second casing includes a second cover portion supporting the part of the optical fiber assembly and the processing unit, and the sealing element further includes a second sealing strip with a positioning block disposed on the second sealing strip. The second sealing strip is arranged on peripheries of the second cover portion facing the first sealing strip, and the positioning block is disposed against the retaining block in the notch portion.

Optionally, the first casing further includes a first frame portion, the first frame portion is arranged on the peripheries of the first cover portion and protrudes toward the second casing to form a first groove, and the first sealing strip is disposed in the first groove.

Optionally, the second casing further includes a second frame portion, the second frame portion is arranged on the peripheries of the second cover portion and protrudes toward the first casing to form a second groove, and the second sealing strip is disposed in the second groove.

Optionally, the positioning block includes a pair of second tab portions extending outward from opposite sides of the second sealing strip to fit against the notch portion.

Optionally, the sealing element further includes a third sealing strip arranged on a surface of the second casing opposite to a surface facing the second sealing strip.

Optionally, the second frame portion includes a third groove located under the second groove and exposed to outside in a direction opposite to the second groove, and the third sealing strip is disposed in third groove.

Optionally, the first casing includes a first cover portion and a first frame portion arranged on peripheries of the first cover portion and protrudes toward the second casing, the first frame portion includes a first groove and a filling port communicating with the first groove, and the sealing element further includes a sealing material filled from the filling port to fill up the first groove and encompass the retaining block in the notch portion.

Optionally, the second casing includes a second cover portion and a second frame portion arranged on peripheries of the second cover portion corresponding to the first frame portion, the second frame portion includes a second groove communicating with the first groove, and the sealing material fills up the second groove.

Optionally, the second frame portion further includes a third groove located under the second groove and exposed to outside in a direction opposite to the second groove and communicating with the second groove such that the sealing material fills up the third groove from the second groove.

Optionally, the first casing includes a first frame portion and the second casing includes a second frame portion, the notch portion is positioned between the first frame portion and the second frame portion, and the first frame portion and the second frame portion are soldered or welded along junctions of the first casing and the second casing and boundaries between the first casing, the second casing, and the retaining block such that the first casing and the second casing are secured together and the retaining block is in an airtight arrangement with the first casing and the second casing.

Optionally, the notch portion includes a first notch and a second notch, the first notch is disposed on the first casing, the second notch is disposed on the second casing and corresponding to the first notch, and the retaining block is positioned between the first notch and the second notch.

Optionally, the optoelectronic transceiver device further includes a plurality of functional lines, one end of each of the functional lines is connected to the load board, and the other end passes through the sealing element and extends out of the main board.

Optionally, the retaining block includes an alloy body, a metal coating layer, and capping elements. The metal coating layer completely covers the part of the optical fiber assembly, the alloy body bonds the metal coating layer with the part of the optical fiber assembly, and the capping elements seals opposite ends of the alloy body.

Optionally, the optoelectronic transceiver device further includes at least an optoelectronic transceiver module connected to the optical fiber assembly. The optoelectronic transceiver module includes a base and a waveguide device disposed in the base.

Optionally, the optical fiber assembly includes a plurality of optical fibers and a mating connector structured to be connected to the optoelectronic transceiver connector.

Another aspect of the present application is to provide a sealing structure for an optoelectronic transceiver device, the optoelectronic transceiver device including a main board, a load board disposed on the main board, a processing unit disposed on the load board, and at least an optoelectronic transceiver module connected to the processing unit. The sealing structure includes a first casing; a second casing disposed on the load board and assembled with the first casing such that a part of the optoelectronic transceiver module and the processing unit are arranged between the first casing and the second casing; and a sealing element disposed between the first casing and the second casing. The optoelectronic transceiver module includes a detachable optical coupling structure including a first connector disposed on the load board and including a base; and a waveguide device disposed in the base; and a second connector including an optical fiber assembly. The second connector is detachably connected to the first connector.

Optionally, at least a notch portion is arranged between peripheral portions of the first casing and the second casing, and the sealing element includes at least a retaining block positioned in the notch portion and encompassing a part of the optical fiber assembly extending out of the notch portion.

In the embodiments of the present application, the sealing structure renders the optoelectronic transceiver device in the immersion cooling system excellent hermetic, which prevents liquid, moisture, or air from entering the accommodation space, thus protecting internal components from damage due to the permeation or leakage issue. In addition, the part of the optical fiber assembly is encompassed and retained in the retaining block in the notch portion along with the sealing material, the soldering material, or the stack arrangement of the first sealing strip and the second sealing strip, thereby further ensuring the hermetic state for the optoelectronic transceiver device.

BRIEF DESCRIPTION OF DRAWINGS

To describe the technical solutions in the embodiments of the present application, the following briefly introduces the drawings for describing the embodiments. The drawings in the following description show merely some embodiments of the present application, and a person skilled in the art may still derive other drawings from these drawings without creative efforts.

DESCRIPTION OF PREFERRED EMBODIMENTS

Figure 1:
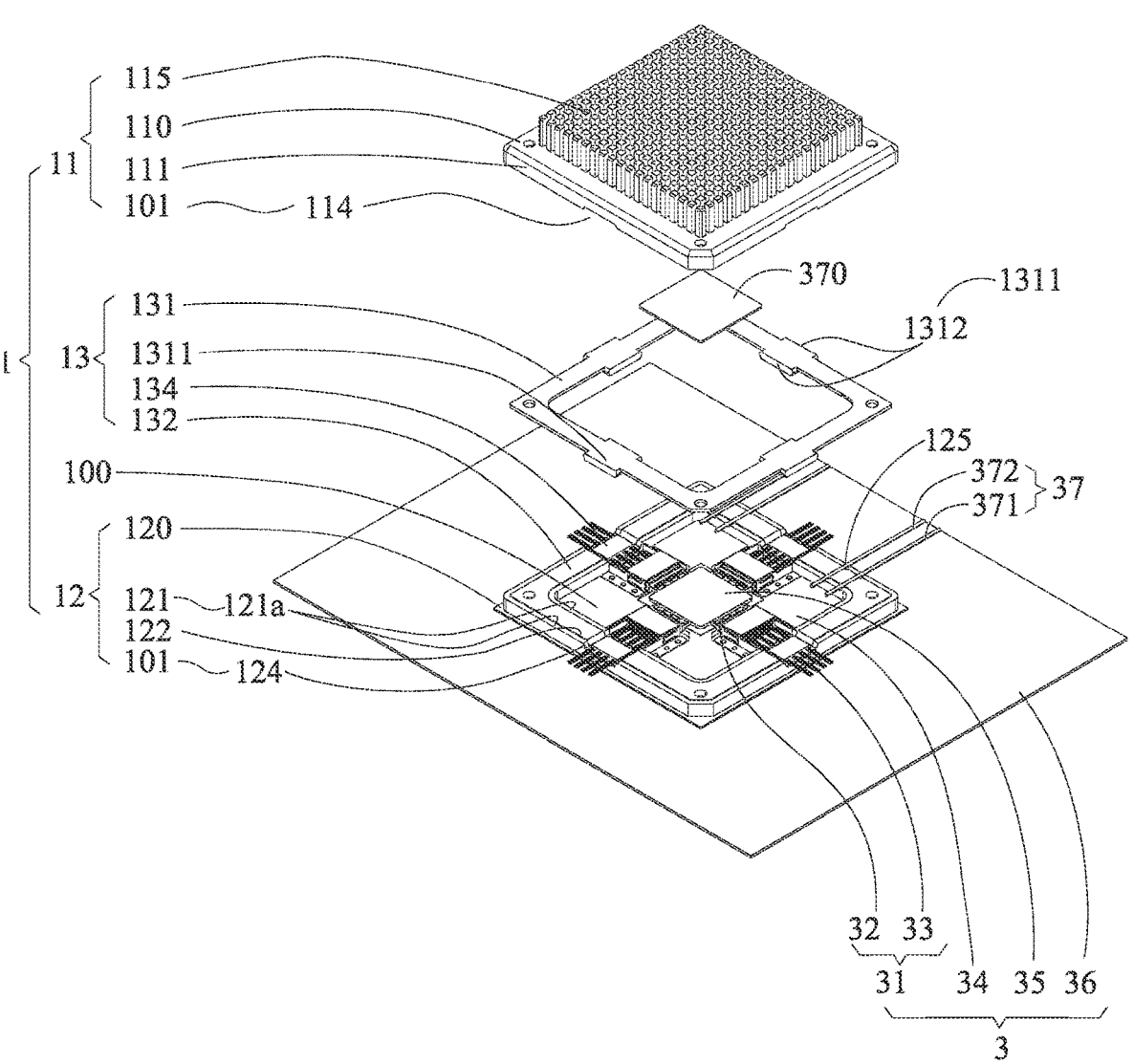
FIG. 1 is a schematic exploded view of an optoelectronic transceiver device including a sealing structure in accordance with an embodiment of the present application.

The following embodiments are referring to the appendix drawings for exemplifying specific implementable embodiments of the present application. Directional terms described by the present application, such as upper, lower, front, back, left, right, inner, outer, side, etc., are only directions by referring to the drawings, and thus the used directional terms are used to describe and understand the present application, but the present application is not limited thereto.

It should be understood that, although the terms first, second, etc. may be used herein to describe various elements, these elements should not be limited by these terms.

Unless indicated otherwise, these terms are only used to distinguish one element from another element. Thus, for example, a first element, a first component or a first section discussed below could be termed a second element, a second component or a second section without departing from the teachings of the present application. In addition, the present application may repeat reference numerals and/or letters in the various examples. This repetition is for the purpose of simplicity and clarity and does not in itself dictate a relationship between the various embodiments and/or configurations discussed.

The present invention provides a sealing structure for an optoelectronic transceiver device. In some embodiments, the optoelectronic transceiver device is operable in an immersion cooling container with a fluid coolant and the sealing structure of the present application ensures a leak-tight and an airtight state of the optoelectronic transceiver device.

Figure 2:
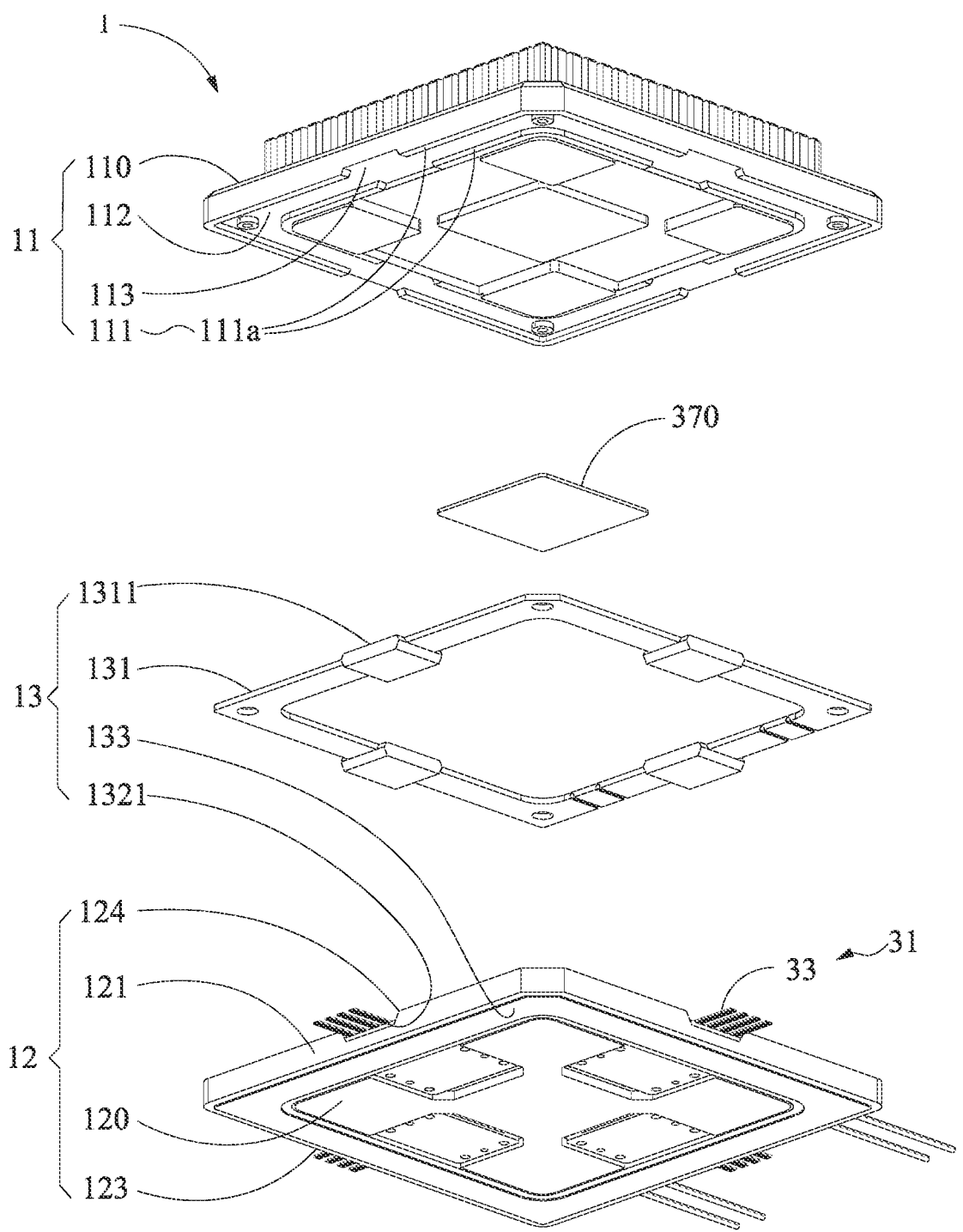
FIG. 2 is a schematic exploded view of the optoelectronic transceiver device including the sealing structure of FIG. 1 at a bottom viewing angle.
Figure 2A:
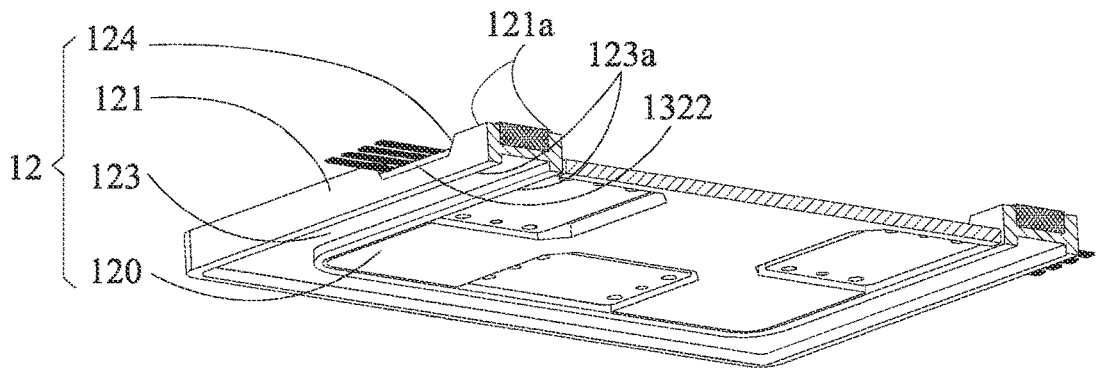
FIG. 2A is a partially enlarged view of the sealing structure shown in FIG. 2.
Figure 2B:
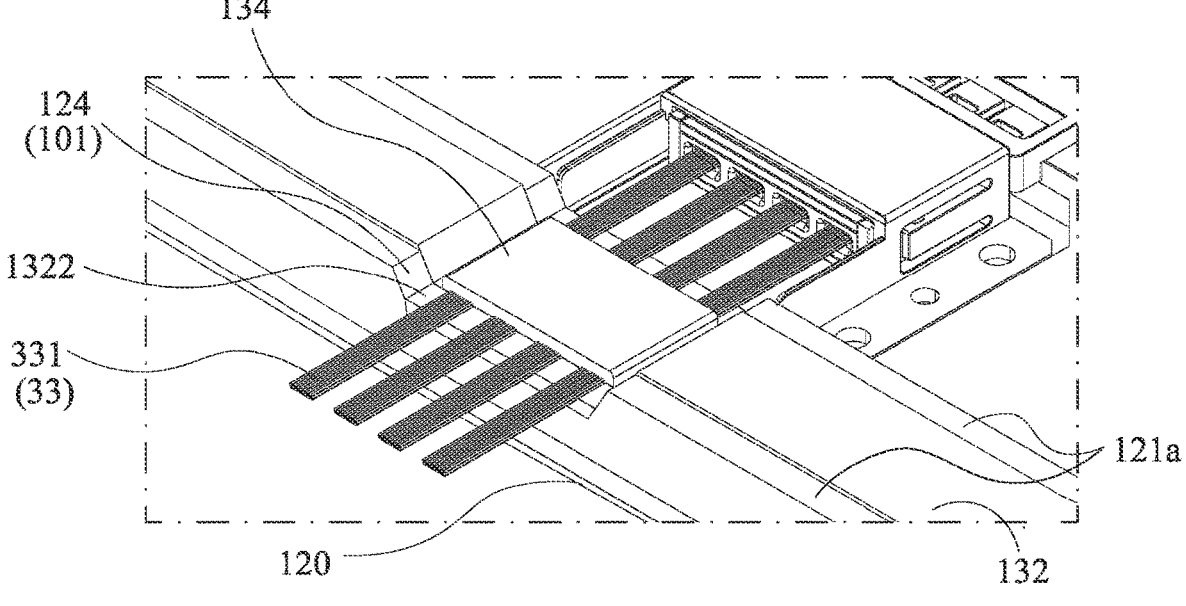
FIG. 2B is a partially enlarged view of the sealing structure shown in FIG. 1.
Figure 3:
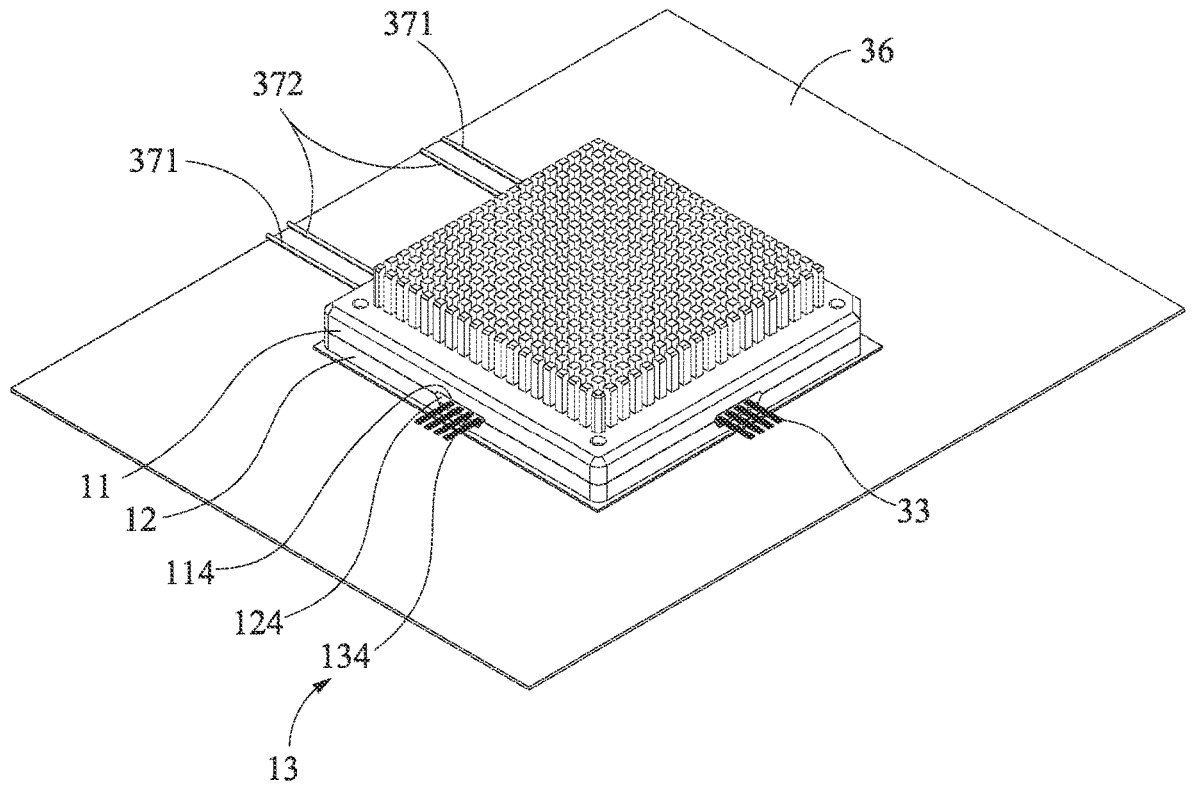
FIG. 3 is a schematic perspective assembly view of the optoelectronic transceiver device including the sealing structure of FIG. 1.
Figure 4:
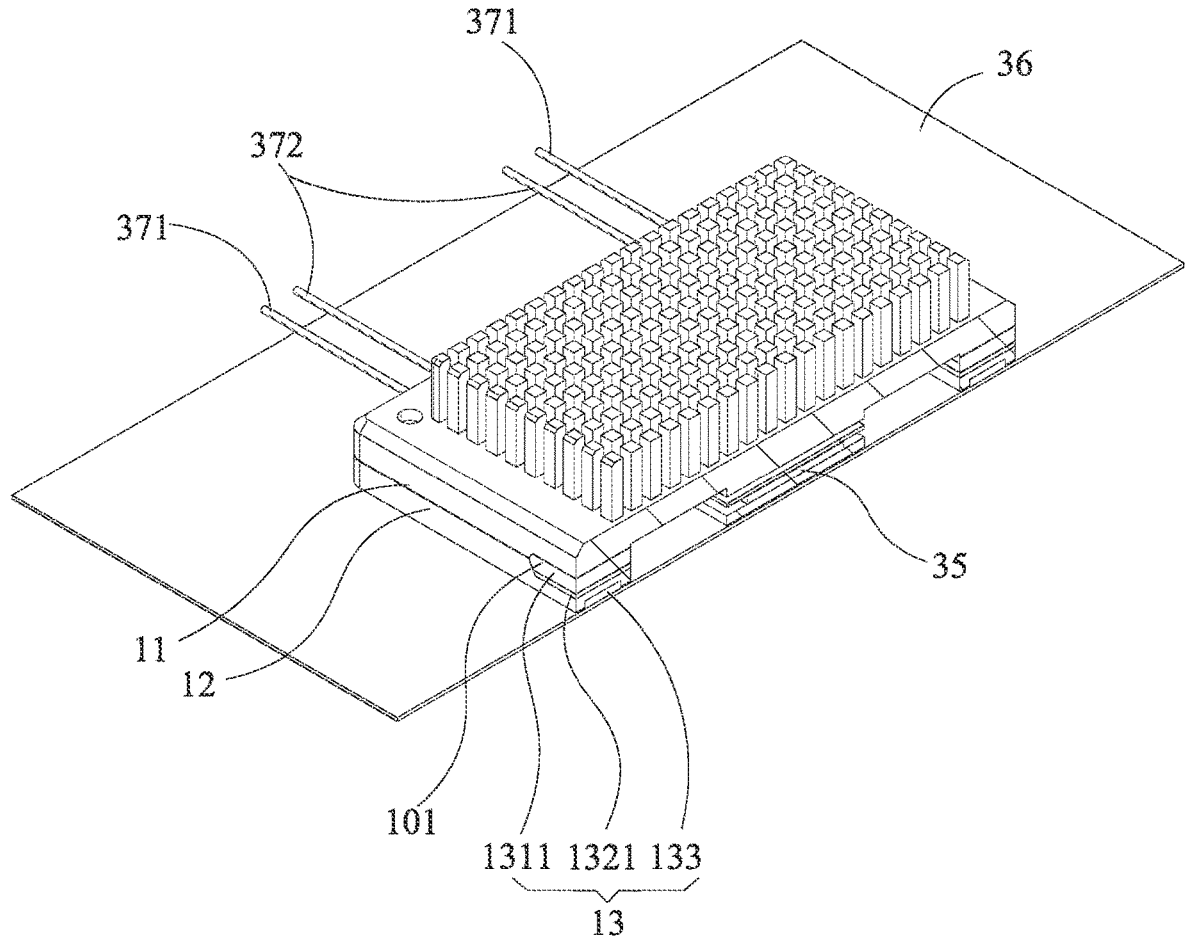
FIG. 4 is a schematic cross-sectional view of the sealing structure of FIG. 3.

Referring to FIGS. 1 to 4, FIG. 1 is a schematic exploded view of an optoelectronic transceiver device including a sealing structure in accordance with a first embodiment of the present application, FIG. 2 is a schematic exploded view of the optoelectronic transceiver device including the sealing structure of FIG. 1 at a bottom viewing angle, FIG. 2A is a partially enlarged view of the sealing structure shown in FIG. 2, FIG. 2B is a partially enlarged view of the sealing structure shown in FIG. 1, FIG. 3 is a schematic perspective assembly view of the optoelectronic transceiver device including the sealing structure of FIG. 1, and FIG. 4 is a schematic cross-sectional view of the sealing structure of FIG. 3. As shown in FIGS. 1 and 2, the sealing structure 1 includes a first casing 11, a second casing 12, and a sealing element 13. The first casing 11 and the second casing 12 are sized and shaped to be tightly assembled with each other and accommodate the optoelectronic transceiver device 3 therebetween. It should be noted that the tight assembly of the first casing 11 and the second casing 12 refers to bottom edges of the first casing 11 adjoin top edges of the second casing 12 in a way that liquid or air cannot enter an internal space where the optoelectronic transceiver device 3 is placed from junctions of the first casing 11 and the second casing 12. In some embodiments, the first casing 11 and the second casing 12 may be assembled through, e.g., screw fastening, structural coupling, adhesive connection, or the like, in a stack and tight arrangement.

As shown in FIGS. 1 and 2, the first casing 11 and the second casing 12 are square in shape and detachably assembled with each other to form an accommodation space 100, but the shape of the first and second casings 11 and 12 are not limited thereto. Specifically, the first casing 11 includes a first cover portion 110 and a first frame portion 111. The first frame portion 111 is disposed on a side of the first cover portion 110 and faces the second casing 12. In some embodiments, as shown in FIG. 2, the first frame portion 111 is configured to surround peripheries of the first cover portion 110 and is shaped to form a first groove 112 located in the first frame portion 111. In detail, the first frame portion 111 protrudes outward from the first cover portion 110 toward the second casing 12, and the first groove 112 is arranged along the entire first frame portion 111 and exposed to the second casing 12.

Still referring to FIGS. 1 and 2, in this embodiment, the first frame portion 111 includes a pair of first frame walls 111a spaced apart from each other to form a space into a single first groove 112 between the first frame walls 111a, but the number of the first groove 112 is not limited thereto. In some embodiments, there may be provided one or more partition walls (not shown) between the first frame walls 111a to form a plurality of first grooves 112.

As shown in FIG. 1, the second casing 12 includes a second cover portion 120 and a second frame portion 121. In some embodiments, the second frame portion 121 is disposed on a side of the second cover portion 120 and faces the first casing 11. In some embodiments, as shown in FIGS. 1 and 2, the second frame portion 121 is configured to surround peripheries of the second cover portion 120 and is shaped to form a second groove 122 located in the second frame portion 121. In detail, the second frame portion 121 protrudes outward from the second cover portion 120 toward the first casing 11, and the second groove 122 is arranged along the entire second frame portion 121 and exposed to the first groove 112. In this embodiment, the second frame portion 121 includes a pair of second frame walls 121a spaced apart from each other to form a single second groove 122 between the second frame walls 121a. Preferably, the second groove 122 is formed to correspond to the first groove 112.

Referring to FIGS. 1 and 2, a plurality of notch portions 101 are arranged between peripheral portions of the first casing 11 and the second casing 12. Specifically, each of the notch portions 101 is formed by a first notches 114 and a second notch 124. In detail, the first notch 114 is recessed from edges of the first frame walls 111a, and the second notch 124 is recessed from edges of the second frame walls 121a. The first notch 114 and the second notch 124 jointly form the notch portion 101 after the first casing 11 is assembled with the second casing 12.

Referring to FIGS. 1, 2 and 2A, the second casing 12 further includes a third groove 123, which is formed on a side of the second cover portion 120 facing a main board 36. In some embodiments, the third groove 123 is located under and opposite to the second groove 122. Specifically, the second frame portion 121 further includes a pair of third frame walls 123a spaced apart from each other and extending in direction opposite to the second frame walls 121a in such a way that a single third groove 123 is formed between the third frame walls 123a.

Figure 4A:
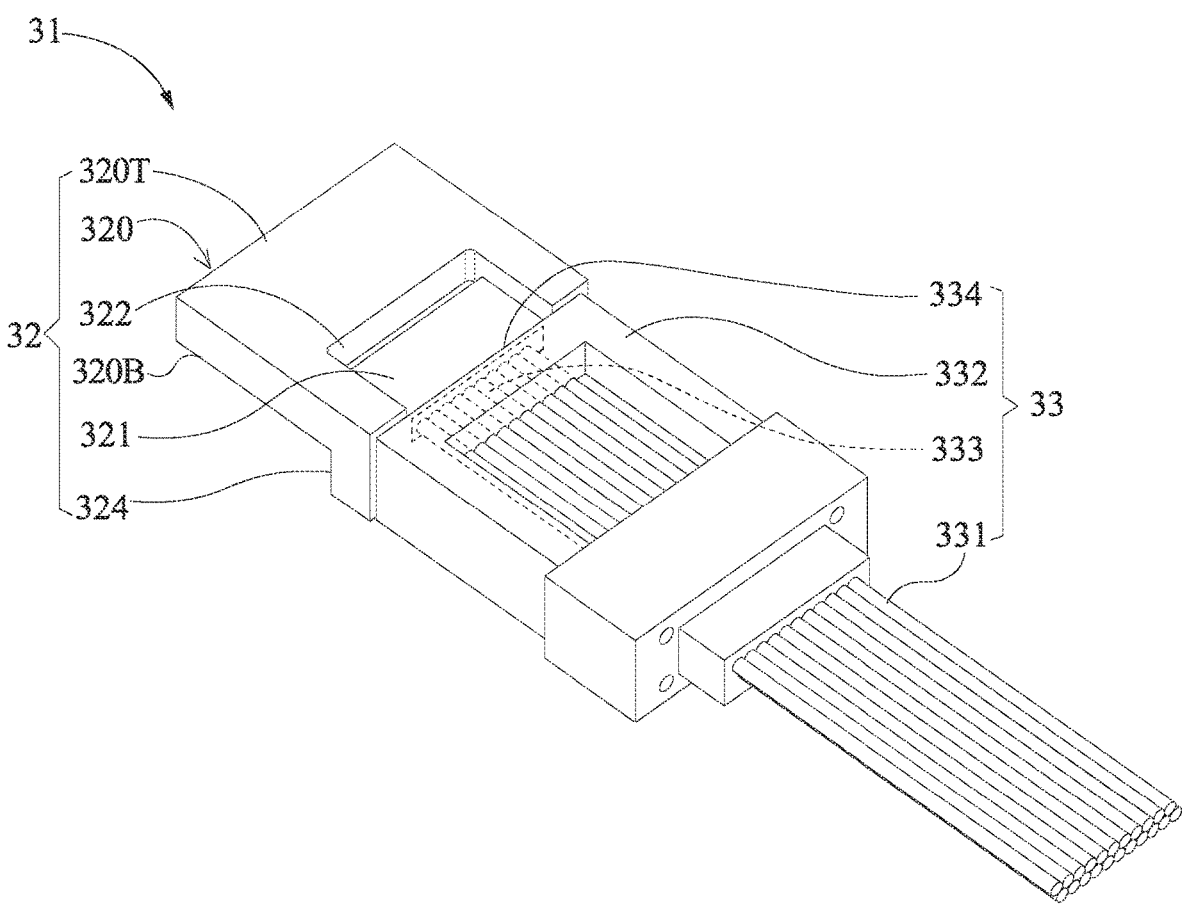
FIG. 4A is a schematic structural view of an assembly of an optoelectronic transceiver connector and an optical fiber assembly included in the optoelectronic transceiver device in accordance with an embodiment of the present application.

Referring to FIG. 1, in some embodiments, the optoelectronic transceiver device 3 includes a plurality of optoelectronic transceiver modules 31, a processing unit 35, a load board 34, and a main board 36. The optoelectronic transceiver modules 31 are electrically connected to the processing unit 35, which is disposed on the load board 34, i.e., a printed circuit board. Specifically, each of the optoelectronic transceiver modules 31 includes an optoelectronic transceiver connector 32 and an optical fiber assembly 33 connected to the optoelectronic transceiver connector 32. In some embodiments, the processing unit 35 may include one or a plurality of electronic integrated circuits (EIC), such as microprocessors, application specific integrated circuits (ASIC), or memory, and one or a plurality of photonic integrated circuits (PIC). In this embodiment, there are four optoelectronic transceiver modules 31 arranged around the processing unit 35. In some other embodiments, each side of the processing unit 35 may be connected with two, four, or eight optoelectronic transceiver modules 31. It is noted the number of the optoelectronic transceiver modules 31 is determined according to requirements of actual applications. In some embodiments, the optical fiber assembly 33 includes a plurality of optical fibers 331 arranged in rows (as shown in FIG. 4A).

As shown in FIG. 1, the optoelectronic transceiver modules 31, the processing unit 35, and the load board 34 are disposed in the accommodation space 100. In some embodiments, the optoelectronic transceiver device 3 further includes a plurality of functional lines 37, one end of each of the functional lines 37 is connected to the load board 34, and the other end of the functional lines 37 passes through the sealing element 13 and extends out of the main board 36. In some embodiments, the functional lines 37 include two power lines 371 and two pressure-regulated pipes 372. The power lines 371 are used to provide power for the components disposed on the load board 34. The pressure-regulated pipes 372 are used to maintain the atmospheric pressure of the accommodation space 100 in response to temperature fluctuations in the accommodation space 100 so as to ensure a normal operation of the optoelectronic transceiver device 3. As shown in FIGS. 1 and 2, the first cover portion 110 covers a part of the optical fiber assembly 33, the optoelectronic transceiver connector 32, and the processing unit 35. In this embodiment, a heat dissipation portion 115 is disposed on a surface of the first cover portion 110 opposite to a surface facing the second casing 12, and a heat conductive element 370 is arranged between and in contact with the processing unit 35 and the first cover portion 110. The heat dissipation portion 115 and the heat conductive element 370 are provided to facilitate heat dissipation of the processing unit 35. The second cover portion 120 supports the part of the optical fiber assembly 33, the optoelectronic transceiver connector 32, and the processing unit 35.

Still referring to FIGS. 1 and 2, the sealing element 13 includes a first sealing strip 131, a second sealing strip 132, a third sealing strip 133, and a plurality of retaining blocks 134. The first sealing strip 131 is arranged on peripheries of the first cover portion 110. Specifically, the first sealing strip 131 is positioned in and along the first frame portion 111 and is sized to snugly fit to the entire first groove 112. In some embodiments, the first sealing strip 131 can be made of a material including, such as rubber, silicon, fluoro-rubber (also known as Viton, FPM, or FKM), silicone, or silicone compound, but is not limited thereto. It is noted the first sealing strip 131 is made a material that can provide excellent resistance to heat and cold and has an operating temperature range of −60° C. to 250° C. so as to prevent gas and fluid leaks in static and dynamic applications.

Referring to FIGS. 1 and 2B, each of the retaining blocks 134 is tightly positioned in a respective one of the notch portions 101 and encompasses a part of the optical fiber assembly 33 that extends out of the notch portion 101. In some embodiments, the retaining block 134 encompasses the optical fibers 331 of the optical fiber assembly 33 so that the optical fibers 331 are securely positioned by the retaining block 134 in the notch portion 101. Specifically, the retaining block 134 is sized to be disposed within the second notch 124 of the notch portion 101. In detail, as shown in FIG. 2B, the retaining block 134 has a width in a width direction defined between and perpendicular to the second frame walls 121*a*, and the width of the retaining block 134 is less than a width of the second sealing strip 132 plus a width of either one of the second frame walls 121*a*, so that the retaining block 134 can be thoroughly encompassed and sandwiched by the first sealing strip 131 and the second sealing strip 132. In some embodiments, the retaining block 134 is made of the same material as the first sealing strip 131 but is not limited thereto.

As shown in FIG. 1, the first sealing strip 131 includes a sealing block 1311 disposed on the first sealing strip 131. In some embodiments, the sealing block 1311 includes a pair of first tab portions 1312 extending outward from opposite sides of the first sealing strip 131 in the width direction to fit against the notch portion 101. In some embodiments, the sealing block 1311 has a thickness greater than a thickness of the first sealing strip 131 to fit against the retaining block 134 in the notch portion 101, thereby enhancing the fixed disposition of the retaining block 134 and improving the hermetic performance in the notch portion 101.

As shown in FIGS. 1 to 2B, the second sealing strip 132 is arranged on peripheries of the second cover portion 120. Specifically, the second sealing strip 132 is positioned in and along the second frame portion 121 and is sized to snugly fit to the entire second groove 122. In some embodiments, the second sealing strip 132 can be made of the same material as the first sealing strip 131, but is not limited thereto. As shown in FIGS. 2 and 2B, the second sealing strip 132 includes a positioning block 1321 positioned in the notch portion 101. In this embodiment, the positioning block 1321 includes a pair of second tab portions 1322 extending outward from opposite sides of the second sealing strip 132 in the width direction to fit against the second notch 124. In detail, as shown in FIGS. 2, 2A, and 2B, the second tab portions 1322 fit against an edge of the second frame walls 121*a* in the second notch 124 in such a way that the optical fibers 331 of the optical fiber assembly 33 are in no contact with the second frame walls 121*a*, thereby providing sufficient sealing for the second notch 124.

Still referring to FIG. 1, in some embodiments, the second frame portion 121 further includes a plurality of positioning grooves 125 disposed on the second frame walls 121*a*. The power lines 371 and the pressure-regulated pipes 372 are arranged in place through the positioning grooves 125 as well as passing through the positioning grooves 125 and the second sealing strip 132, respectively.

Referring to FIGS. 2 and 2A, the third sealing strip 133 is arranged on a surface of the second casing 12 opposite to a surface facing the second sealing strip 132. Specifically, the third sealing strip 133 is positioned in and along the third groove 123 and is sized to snugly fit to the entire third groove 123. In some embodiments, the third sealing strip 133 can be made of the same material as the first sealing strip 131, but is not limited thereto.

Referring to FIGS. 1 to 4, after assembly, the first sealing strip 131, the second sealing strip 132, and the third sealing strip 133 are positioned in an up-and-down arrangement in a vertical direction with respect to the first casing 11 and the second casing 12. With the disposition of the sealing element 13, a sealing barrier is created around the accommodation space 100, which in term renders the assembly of the first casing 11 and the second casing 12 excellent hermetic and prevents liquid and air from entering the accommodation space 100, thus preventing fluid coolant or liquid permeation and protecting internal components from damage due to the permeation or leakage issue. In addition, the part of the optical fiber assembly 33 extending out of the accommodation space 100 is encompassed and retained in the retaining block 134 in the notch portion 101 along with the stack arrangement of the first sealing strip 131 and the second sealing strip 132, which encompasses and sandwiches the retaining block 134 with the sealing block 1311 and the positioning block 1321, thereby further ensuring the hermetic state in the notch portion 101.

Figure 4B:
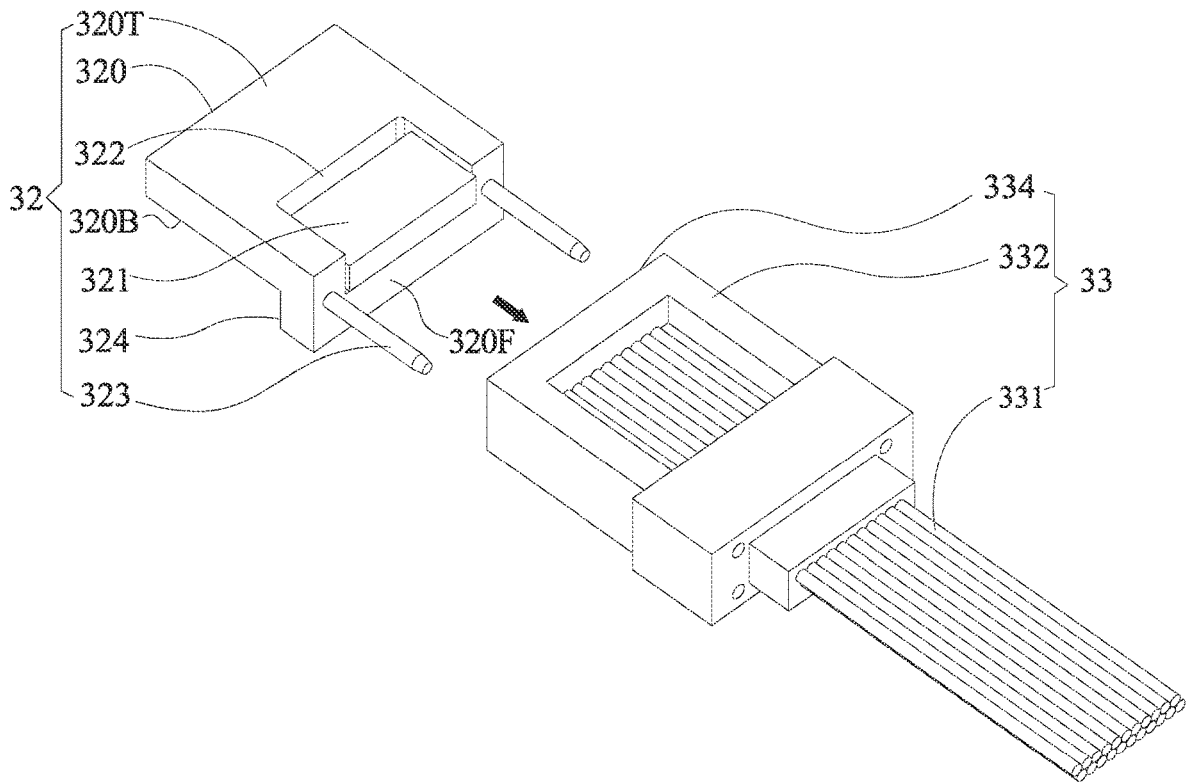
FIG. 4B is a schematic structural view showing the optoelectronic transceiver connector and the optical fiber assembly of FIG. 4A in a detached state.

Referring to FIGS. 4A and 4B in combination with FIG. 1, FIG. 4A is a schematic structural view of an assembly of the optoelectronic transceiver connector 32 and the optical fiber assembly 33 included in the optoelectronic transceiver device 3, and FIG. 4B is a schematic structural view showing the optoelectronic transceiver connector 32 and the optical fiber assembly 33 of FIG. 4A in a detached state. In some embodiments, the optoelectronic transceiver module 31 includes a detachable optical coupling structure including: a first connector (such as the optoelectronic transceiver connector 32) and a second connector (such as the optical fiber assembly 33). The second connector is detachably connected to the first connector. The optoelectronic transceiver connector 32 includes a base 320 and a waveguide device 321. The base 320 includes a lower surface 320B, an upper surface 320T, and a front end 320F connected between the lower surface 320B and the upper surface 320T. In some embodiments, a recessed portion 322 is formed in the base 320 and is recessed from the front end 320F, and the waveguide device 321 is disposed in the recessed portion 322. In detail, the recessed portion 322 is configured to pass through parts of the lower surface 320B, the upper surface 320T, and the front end 320F of the base 320.

In some embodiments, as shown in FIG. 4B, a plurality of positioning elements 323 are symmetrically arranged on the front end 320F of the base 320 with respect to a middle of the base 320, and are spaced apart from each other on opposite sides of the recessed portion 322 and the waveguide device 321. A retaining wall 324 is formed on the base 320 and bends and extends downward from the lower surface 320B such that the base 320 has an inverted L-shaped cross-sectional profile. In this embodiment, there are two positioning elements 323, which are pin-like in shape and extend in an outward direction from the front end 320F on the retaining wall 324, respectively. In some embodiments, the base 320 is made of material having the characteristic of high temperature resistance, such as ceramic or metal, which is, for example, zirconium dioxide ($ZrO_2$). Alternatively, the base 320 may be made of non-metal material, such as organic binders (e.g., resin), polymer, or plastic.

Preferably, the waveguide device 321 is made of a material containing, for example, silica. Alternatively, the waveguide device 321 may be made of a material containing silicon-on-insulator (SOI), lithium niobate ($LiNbO_3$), or polymers. In some embodiments, the waveguide device 321 may be formed using a material of such as fused silica, quartz, glass, borosilicate glass, etc. It should be noted that the waveguide device 20 includes a planar lightwave circuit (PLC). In some embodiments, the planar lightwave circuit may be configured in various ways, including, but not limited to, a straight line circuit, a splitter circuit, an arrayed waveguide grating wavelength multiplexer, and a cross connect-type circuit. Different types of waveguide circuits or devices can be utilized for the planar lightwave circuit in the embodiments of the present application.

Still referring to FIGS. 4A and 4B, in some embodiments, the optical fiber assembly 33 includes the optical fibers 331 and a mating connector 332 structured to be detachably connected to the optoelectronic transceiver connector 32. The optical fibers 331 have a plurality of fiber ends 333 terminated at the mating connector 332 (as shown in FIG. 4A). In this embodiment, the mating connector 332 functions as an optical multi-channel connector and includes a connecting surface 334 arranged facing the front end 320F of the base 320, and a plurality of recesses (not show) of the mating connector 332 arranged to correspond to the pin-like positioning elements 323 (as shown in FIG. 4B). As shown in FIG. 4A, the optical fiber assembly 33 is plugged to the optoelectronic transceiver connector 32. As shown in FIG. 4B, the optical fiber assembly 33 can be removed from the base 320 of the optoelectronic transceiver connector 32.

In this arrangement, as shown in FIG. 4A, the fiber ends 333 of the optical fibers 331 are positioned to directly face the recessed portion 322 at the front end 320F of the base 320 to enable signal transmission between the optical fibers 331 and the waveguide device 321 in a way of surface coupling. It should be noted that the signal transmission between the optical fibers 331 and the waveguide device 321 is not limited to the surface coupling type as described above, and may be various in forms of optical coupling.

Figure 5:
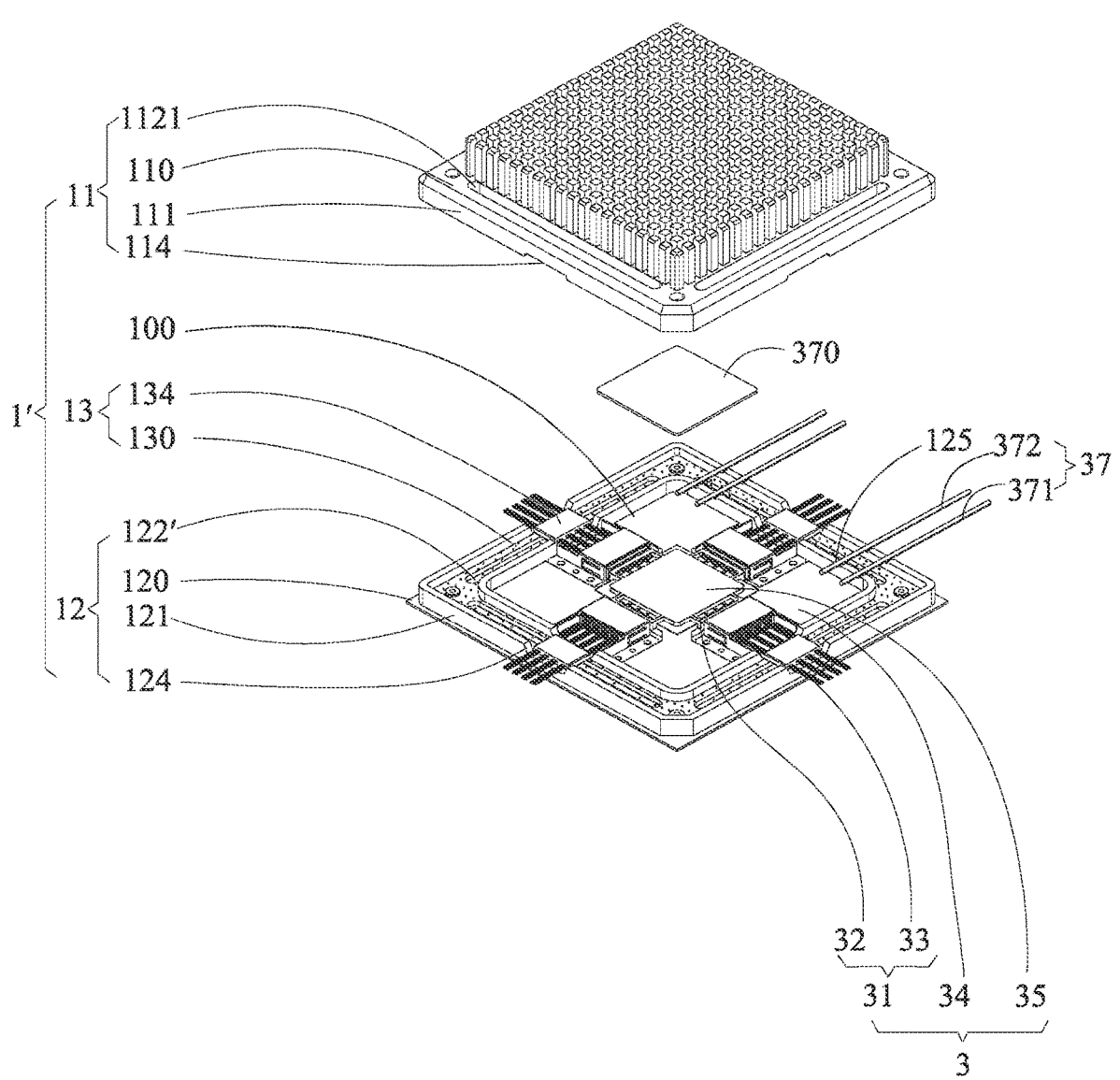
FIG. 5 is a schematic exploded view of an optoelectronic transceiver device including a sealing structure in accordance with an embodiment of the present application.
Figure 6:
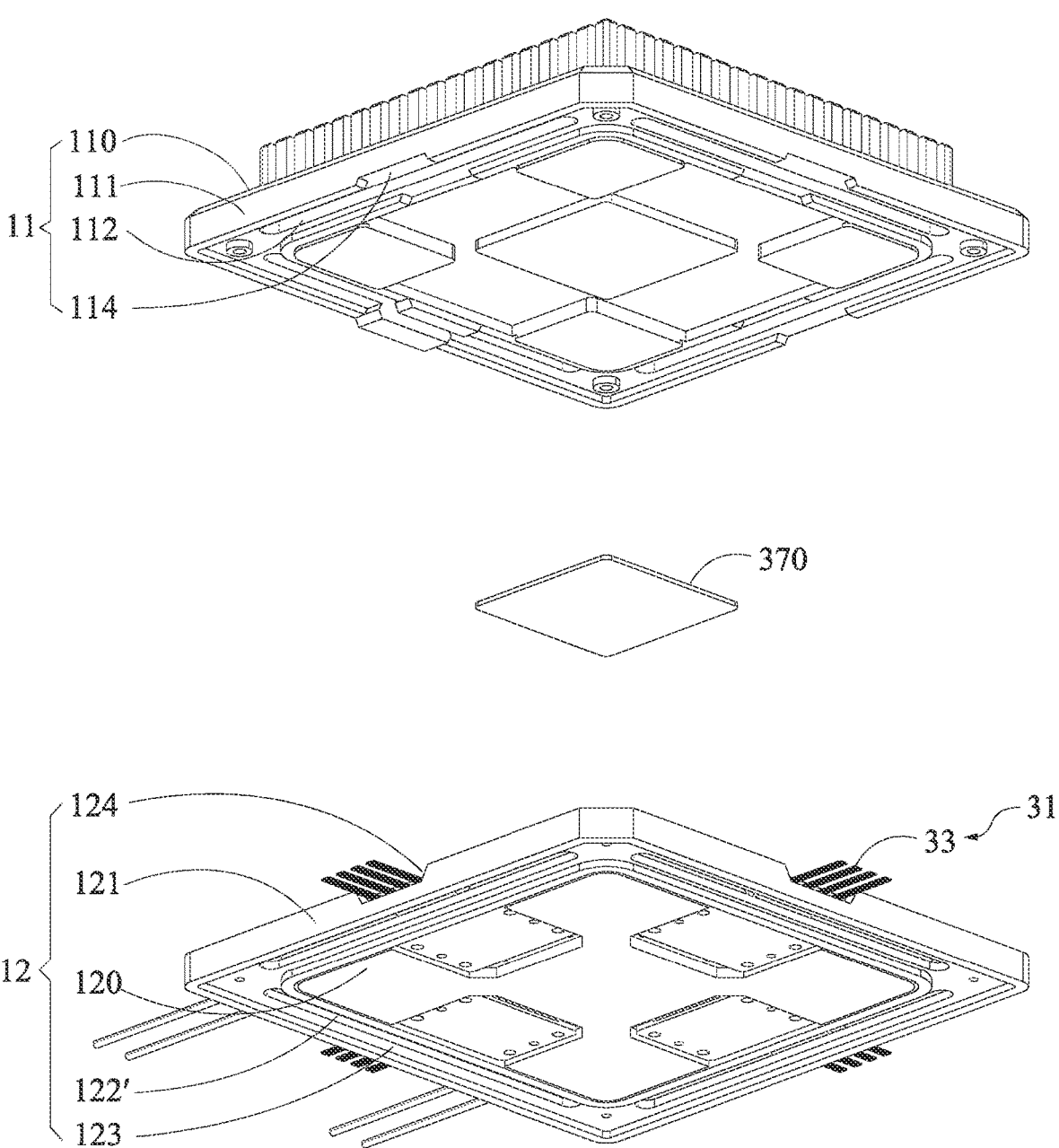
FIG. 6 is a schematic exploded view of the optoelectronic transceiver device including the sealing structure of FIG. 5 at a bottom viewing angle.
Figure 7:
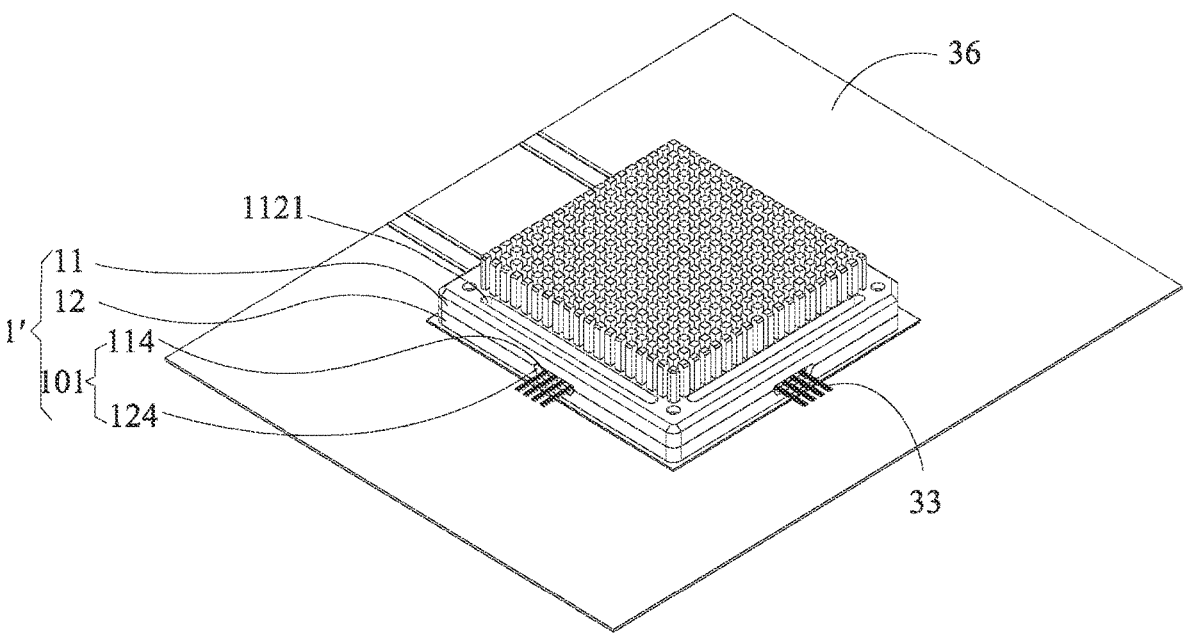
FIG. 7 is a schematic perspective assembly view of the optoelectronic transceiver device including the sealing structure of FIG. 5.
Figure 8:
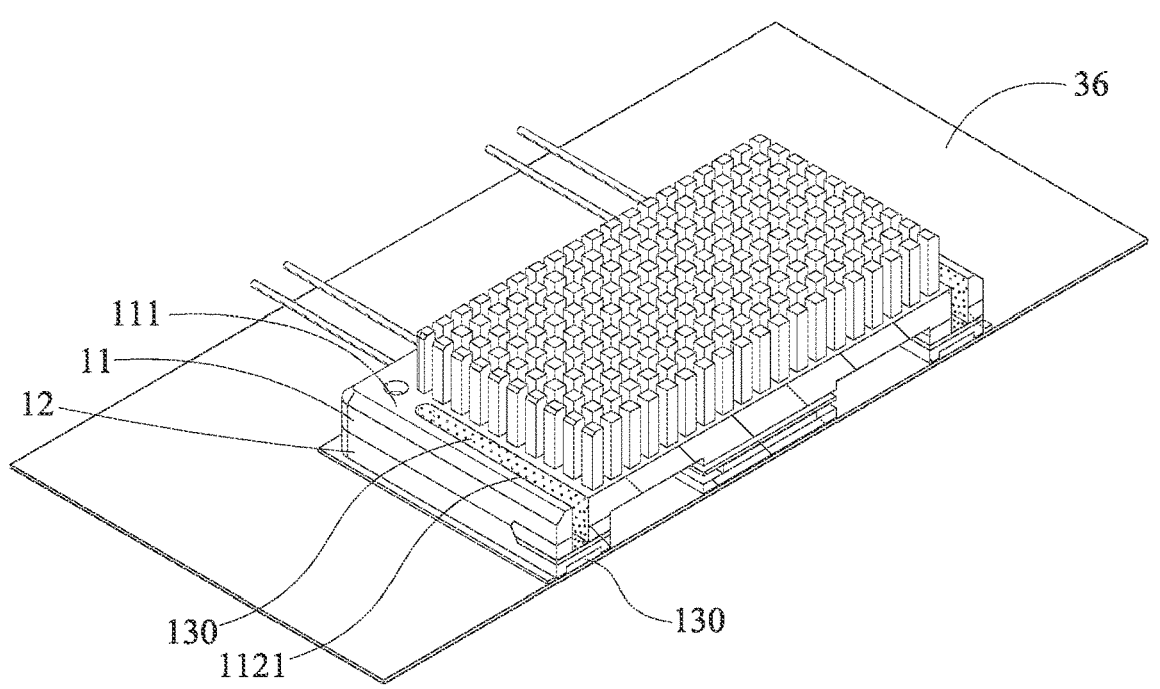
FIG. 8 is a schematic cross-sectional view of the sealing structure of FIG. 7.

Referring to FIGS. 5 to 8 illustrating a sealing structure for an optoelectronic transceiver device in a second embodiment of this application, FIG. 5 is a schematic exploded view of an optoelectronic transceiver device including a sealing structure in accordance with the second embodiment of the present application, FIG. 6 is a schematic exploded view of the optoelectronic transceiver device including the sealing structure of FIG. 5 at a bottom viewing angle, FIG. 7 is a schematic perspective assembly view of the optoelectronic transceiver device including the sealing structure of FIG. 5, and FIG. 8 is a schematic cross-sectional view of the sealing structure of FIG. 7. It should be noted the elements and the structure which are the same as those included in the sealing structure in the first embodiment will not be described in detail in this embodiment.

As shown in FIGS. 5 and 6, the sealing structure 1' includes a first casing 11, a second casing 12, and a sealing element 13. Specifically, the first casing 11 includes a first cover portion 110 and a first frame portion 111. The first frame portion 111 is configured to surround peripheries of the first cover portion 110 and is shaped to form a first groove 112 located in the first frame portion 111. The first frame portion 111 further includes a filling port 1121, which communicates with the first groove 112. In some embodiments, as shown in FIG. 5, the filling port 1121 is exposed at an upper surface of the first frame portion 111 and passes through the upper surface of the first frame portion 111 to a lower surface thereof. In detail, the filling port 1121 is groove-like in shape, which extends to a predetermined length along the first frame portion 111. In some other embodiments, the filling port 1121 may be exposed at a side surface of the first frame portion 111. As show in FIG. 5, similar to the first embodiment, the first notch 114 is formed on the first frame portion 111.

Referring to FIGS. 5 and 7, the second casing 12 is disposed on the main board 36 and includes a second cover portion 120 and a second frame portion 121. The second frame portion 121 is configured to surround peripheries of the second cover portion 120 and is shaped to form a second groove 122' and a third groove 123 located in the second frame portion 121. In this embodiment, a bottom of the second groove 122' is exposed to the third groove 123 such that the second groove 122' communicates with the third groove 123.

Still referring to FIGS. 5 and 6, in the second embodiment of the present application, the sealing element 13 of the sealing structure 1' are integrally formed by filling of a sealing material 130 to form a sealing element 13 with structure like combination of the first sealing strip 131, the second sealing strip 132, and the third sealing strip 133 of the sealing structure 1. In some embodiments, the sealing material 130 may be the same material as the first sealing strip 131 described in the first embodiment.

Referring to FIGS. 5 to 8, after assembly, the filling port 1121 is located on a top of the first casing 11, the first notch 114 and the second notch 124 collectively form the notch portion 101 (as shown in FIG. 7), and the retaining block 134 encompassing the optical fibers of the optical fiber assembly 33 in the notch portion 101. In this manner, the fluid sealing material 130 is filled from the filling port 1121 to flow into and fill up the first groove 112, the second groove 122', and the third groove 123. After a certain period of time for curing the sealing material 130 through natural curing processes or other appropriate methods, the fluid sealing material 130 turns to solid sealing material 130, which is like a structure that the first sealing strip, the second sealing strip, and the third sealing strip are in one-piece form. It should be noted that the internal space of the first groove 112, the second groove 122', and the third groove 123 may be various in forms, but only needs to meet the requirements of the interconnection therebetween.

With the sealing structure 1' described in the second embodiment, the sealing element 13 serves as a sealing barrier around the accommodation space 100, which in term renders the assembly of the first casing 11 and the second casing 12 excellent hermetic, thereby protecting internal components from damage caused by the permeation or leakage issue. In addition, the part of the optical fiber assembly 33 extending out of the accommodation space 100 is encompassed and retained in the retaining block 134 in the notch portion 101 along with the retaining block 134 encompassed and sandwiched by the sealing material 130, thereby further ensuring the hermetic state in the notch portion 101.

Figure 8A:
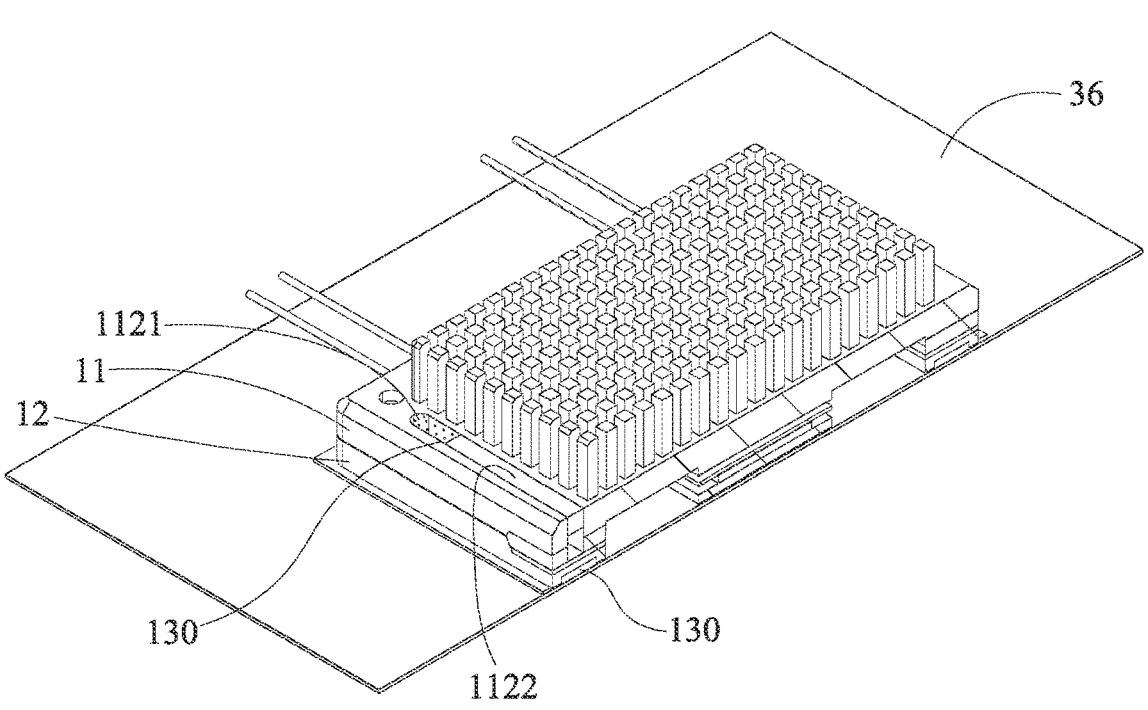
FIG. 8A schematically shows the sealing structure of FIG. 8 having a first casing with a different structure.

Referring to FIG. 8A, FIG. 8A schematically shows the sealing structure 1' of FIG. 8 having the first casing 11 with a different structure. As shown in FIG. 8A, a shielding portion 1122 is formed in a top of the groove-like filling port 1121 to reduce the volume of the filling port 1121, which in turn lowers the amount of the sealing material 130 needed and saves production cost.

Figure 9:
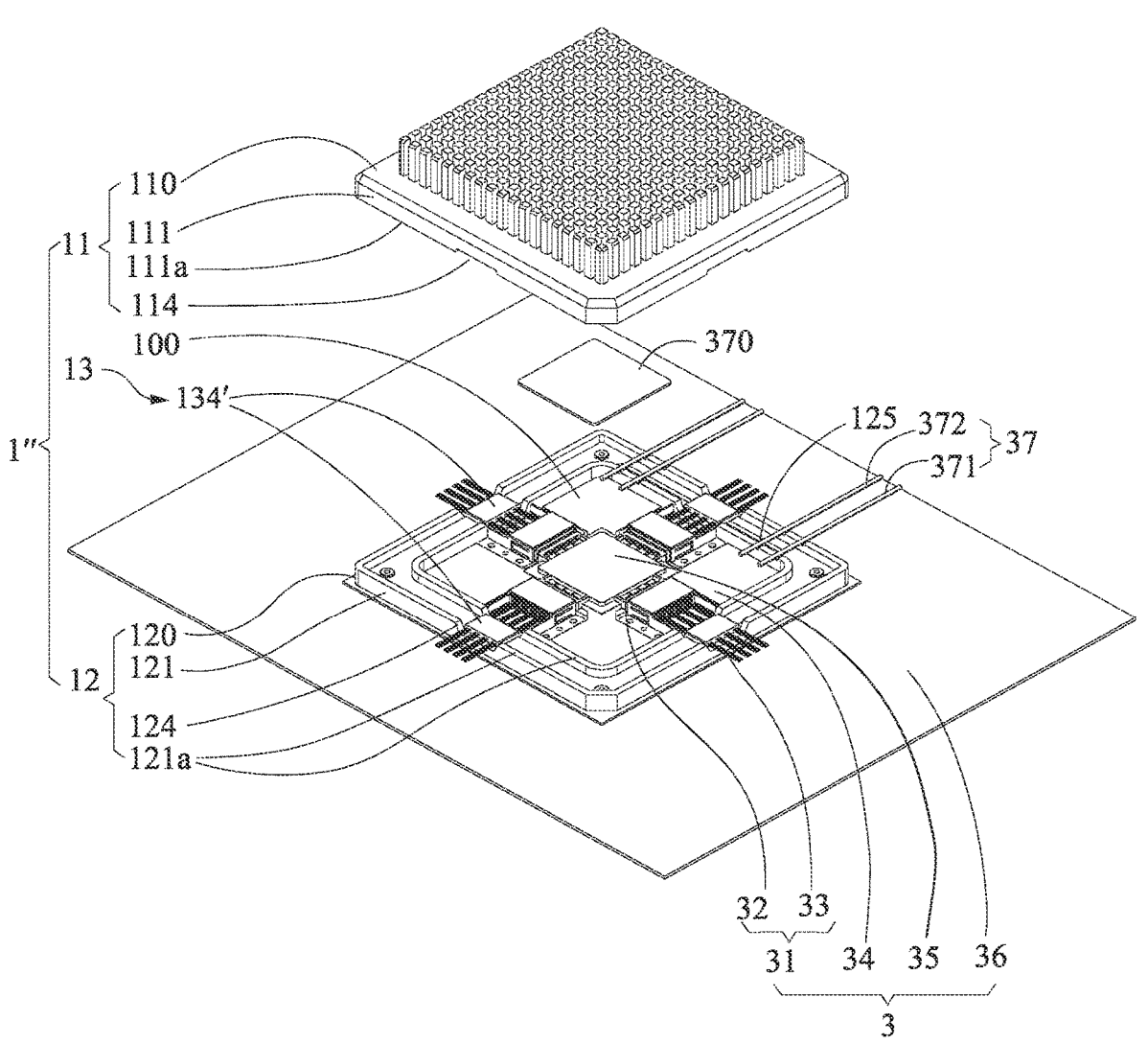
FIG. 9 is a schematic exploded view of an optoelectronic transceiver device including a sealing structure in accordance with an embodiment of the present application.
Figure 10:
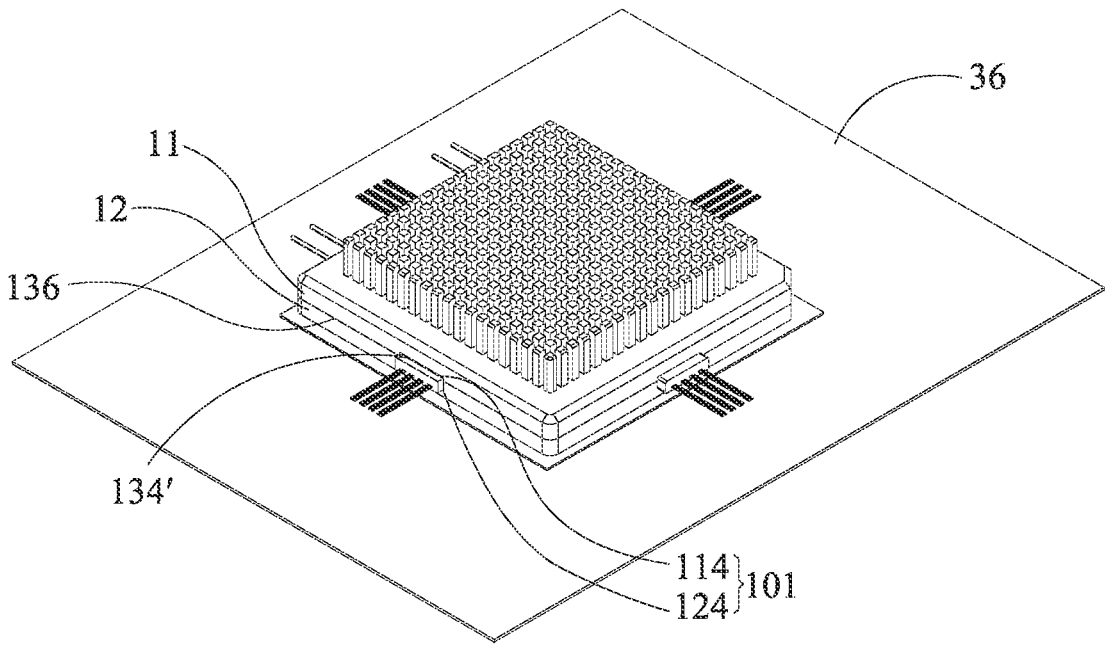
FIG. 10 is a schematic perspective assembly view of the optoelectronic transceiver device including the sealing structure of FIG. 9.
Figure 11:
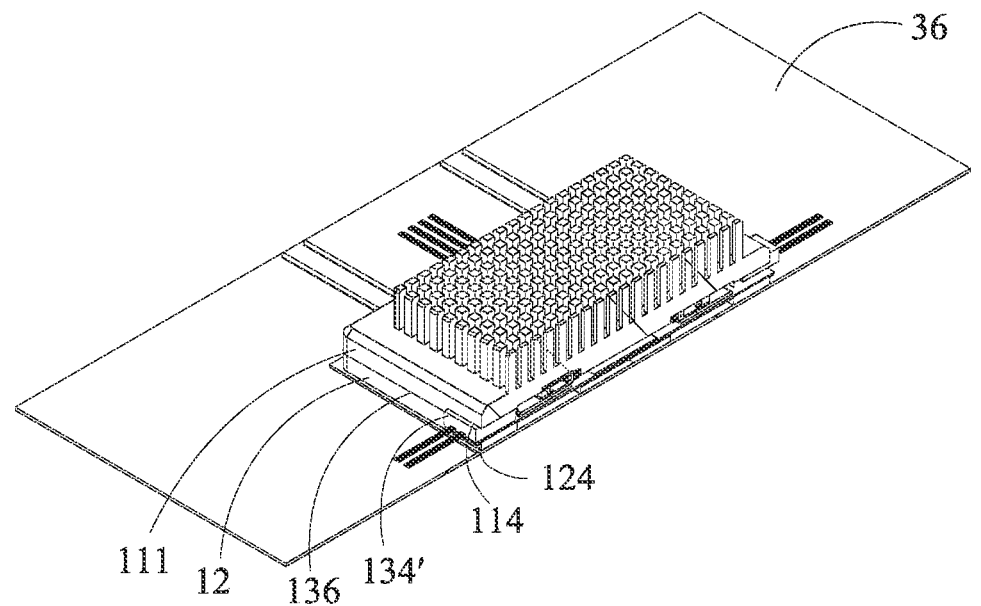
FIG. 11 is a schematic cross-sectional view of the sealing structure of FIG. 11.

Referring to FIGS. 9 to 11, FIG. 9 is a schematic exploded view of an optoelectronic transceiver device including a sealing structure in accordance with a third embodiment of the present application, FIG. 10 is a schematic perspective assembly view of the optoelectronic transceiver device including the sealing structure of FIG. 9, and FIG. 11 is a schematic cross-sectional view of the sealing structure of FIG. 10. As shown in FIGS. 9 to 11, a sealing structure 1" in the third embodiment of the present application is provided. The sealing structure 1" is mainly different from the sealing structures of the first and second embodiments in that a first casing 11 and a second casing 12 are assembled in a soldering or welding manner. It should be noted the elements and the structure which are the same as those included in the sealing structure in the afore-mentioned embodiments will not be described in detail in this embodiment. As shown in FIG. 9, the sealing structure 1" includes a first casing 11, a second casing 12, and a sealing element 13. In this embodiment, the sealing element 13 excludes the above-mentioned first sealing strip 131, the second sealing strip 132, and the third sealing strip 133, but includes a retaining block 134'.

As shown in FIG. 9, the first casing 11 of the sealing structure 1" includes a first cover portion 110 and a first frame portion 111 surrounding peripheries of the first cover portion 110. In this embodiment, the first frame portion 111 includes a pair of first frame walls 111a spaced apart from each other. Still referring to FIG. 9, the second casing 12 includes a second cover portion 120 and a second frame portion 121 surrounding peripheries of the second cover portion 120. In this embodiment, the second frame portion 121 includes a pair of second frame walls 121a spaced apart from each other. As shown in FIG. 9, a first notch 114 is recessed from edges of the first frame walls 111a, a second notch 124 is recessed from edges of the second frame walls 121a, and the first notch 114 and the second notch 124 jointly form a notch portion 101 (as shown in FIG. 10).

As shown in FIGS. 9 to 11, the retaining block 134' is sized to completely block the notch portion 101, i.e., the combination of the first notch 114 and the second notch 124. Preferably, the retaining block 134' is made of Kovar alloy, but is not limited thereto. In this embodiment, the first frame portion 111 and the second frame portion 121 are bonded together in a manner of soldering or welding. In some embodiments, the sealing element 13 further includes a soldering material 136, such as tin. In assembly, the first casing 11 and the second casing 12 are soldered through the soldering material 136 on connection boundaries between the first frame walls 111a and the second frame walls 121a as well as on connection boundaries between the retaining block 134', the first frame portion 111, and the second frame portion 121. In another embodiment, the first frame portion 111 and the second frame portion 121 are laser welded along the connection boundaries between the first casing 11 and the second casing 12 and the connection boundaries between the first casing 11, the second casing 12, and the retaining block 134 in such a way that the first casing 11 and the second casing 12 are secured together and the retaining block 134 is in an airtight arrangement with the first casing 11 and the second casing 12. With the sealing structure 1", the first casing 11 and the second casing 12 are in an excellent sealing state that prevents liquid and air from entering the accommodation space 100, thus protecting internal components from damage caused by the permeation or leakage issue.

Figure 12:
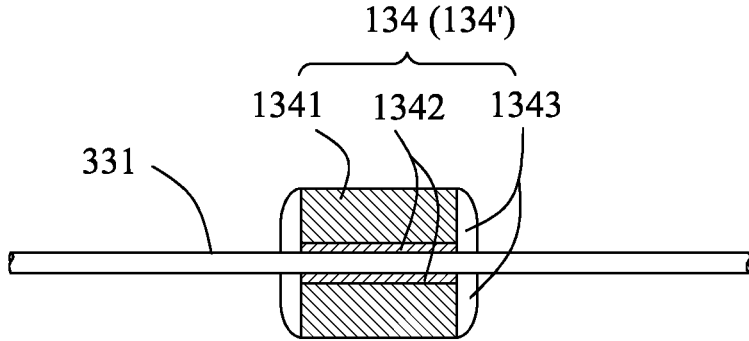
FIG. 12 is a schematic cross-sectional view showing a retaining block of a sealing structure in accordance with an embodiment of the present application.

Referring to FIG. 12, FIG. 12 is a schematic cross-sectional view showing a detail structure of the retaining block 134 and 134' in the present application. As shown in FIG. 12, the retaining block 134 and 134' includes an alloy body 1341, a metal coating layer 1342, and capping elements 1343. The metal coating layer 1342 completely covers the optical fibers 331, which are the part of the optical fiber assembly 33. The alloy body 1341 bonds the metal coating layer 1342 with the optical fibers 331. The metal coating layer 1342 provides good adhesion of the alloy body 1341 on the optical fibers 331. Preferably, the alloy body 1341 has thermal expansion coefficient suitable for the provision of optical fibers. Preferably, the alloy body 1341 is made of Kovar alloy. The capping elements 1343 seal opposite ends of the alloy body 1341. The alloy body 1341 can be soldered or welded with the first casing 11 and the second casing 12. The retaining block 134 and 134' is used to provide good hermetic and prevent the transmitting characteristics of the optical fibers 331 from being affected by pressure resulting from assembling of the first casing 11 and the second casing 12.

Accordingly, the sealing structure provided in the embodiments of the present application renders the optoelectronic transceiver device in the immersion cooling system excellent hermetic, which prevents liquid, moisture, or air from entering the accommodation space, thus protecting internal components from damage due to the permeation or leakage issue. In addition, the part of the optical fiber assembly is encompassed and retained in the retaining block in the notch portion along with the sealing material, soldering material, or the stack arrangement of the first sealing strip and the second sealing strip, thereby further ensuring the hermetic state for the optoelectronic transceiver device.

While the application has been disclosed in conjunction with a description of certain embodiments, including those that are currently believed to be the preferred embodiments, the detailed description is intended to be illustrative and should not be understood to limit the scope of the present application. As would be understood by one of ordinary skill in the art, embodiments other than those described in detail herein are encompassed by the present application. Modifications and variations of the described embodiments may be made without departing from the scope of the application.

What is claimed is:

1. A sealing structure for an optoelectronic transceiver device, the optoelectronic transceiver device comprising a main board, a load board disposed on the main board, a processing unit disposed on the load board, and at least an optical fiber assembly connected to the processing unit, the sealing structure comprising:

a first casing;

a second casing disposed on the load board and assembled with the first casing such that a part of the optical fiber assembly and the processing unit are arranged between the first casing and the second casing, wherein at least a notch portion is arranged between peripheral portions of the first casing and the second casing; and a sealing element comprising at least a retaining block positioned in the notch portion and encompassing a part of the optical fiber assembly extending out of the notch portion, and a first sealing strip with a sealing block disposed on the first sealing strip;

wherein the first casing comprises a first cover portion covering the part of the optical fiber assembly and the processing unit, the first sealing strip is arranged on peripheries of the first cover portion facing the second casing, and the sealing block has a thickness greater than a thickness of the first sealing strip and is disposed against the retaining block in the notch portion.

2. The sealing structure for the optoelectronic transceiver device of claim 1, wherein the sealing block comprises a pair of first tab portions extending outward from opposite sides of the first sealing strip to fit against the notch portion.

3. The sealing structure for the optoelectronic transceiver device of claim 1, wherein the second casing comprises a second cover portion supporting the part of the optical fiber assembly and the processing unit, and the sealing element further comprises a second sealing strip with a positioning block disposed on the second sealing strip, wherein the second sealing strip is arranged on peripheries of the second cover portion facing the first sealing strip, and the positioning block is disposed against the retaining block in the notch portion.

4. The sealing structure for the optoelectronic transceiver device of claim 3, wherein the first casing further comprises a first frame portion, the first frame portion is arranged on the peripheries of the first cover portion and protrudes toward the second casing to form a first groove, and the first sealing strip is disposed in the first groove.

5. The sealing structure for the optoelectronic transceiver device of claim 4, wherein the second casing further comprises a second frame portion, the second frame portion is arranged on the peripheries of the second cover portion and protrudes toward the first casing to form a second groove, and the second sealing strip is disposed in the second groove.

6. The sealing structure for the optoelectronic transceiver device of claim 5, wherein the positioning block comprises a pair of second tab portions extending outward from opposite sides of the second sealing strip to fit against the notch portion.

7. The sealing structure for the optoelectronic transceiver device of claim 5, wherein the sealing element further comprises a third sealing strip arranged on a surface of the second casing opposite to a surface facing the second sealing strip.

8. The sealing structure for the optoelectronic transceiver device of claim 7, wherein the second frame portion comprises a third groove located under the second groove and exposed to outside in a direction opposite to the second groove, and the third sealing strip is disposed in third groove.

9. The sealing structure for the optoelectronic transceiver device of claim 1, wherein the first casing further comprises a first frame portion arranged on peripheries of the first cover portion and protrudes toward the second casing, the first frame portion comprises a first groove and a filling port communicating with the first groove, and the sealing element further comprises a sealing material filled from the filling port to fill up the first groove and encompass the retaining block in the notch portion.

10. The sealing structure for the optoelectronic transceiver device of claim 9, wherein the second casing comprises a second cover portion and a second frame portion arranged on peripheries of the second cover portion corresponding to the first frame portion, the second frame portion comprises a second groove communicating with the first groove, and the sealing material fills up the second groove.

11. The sealing structure for the optoelectronic transceiver device of claim 10, wherein the second frame portion further comprises a third groove located under the second groove and exposed to outside in a direction opposite to the second groove and communicating with the second groove such that the sealing material fills up the third groove from the second groove.

12. The sealing structure for the optoelectronic transceiver device of claim 1, wherein the notch portion comprises a first notch and a second notch, the first notch is disposed on the first casing, the second notch is disposed on the second casing and corresponding to the first notch, and the retaining block is positioned between the first notch and the second notch.

13. The sealing structure for the optoelectronic transceiver device of claim 1, wherein the optoelectronic transceiver device further comprises a plurality of functional lines, one end of each of the functional lines is connected to the load board, and the other end passes through the sealing element and extends out of the main board.

14. The sealing structure for the optoelectronic transceiver device of claim 1, wherein the optoelectronic transceiver device further comprises at least an optoelectronic transceiver module connected to the optical fiber assembly, wherein the optoelectronic transceiver module comprises a base and a waveguide device disposed in the base.

15. The sealing structure for the optoelectronic transceiver device of claim 14, wherein the optical fiber assembly comprises a plurality of optical fibers and a mating connector structured to be connected to the optoelectronic transceiver connector.

16. A sealing structure for an optoelectronic transceiver device, the optoelectronic transceiver device comprising a main board, a load board disposed on the main board, a processing unit disposed on the load board, and at least an optoelectronic transceiver module connected to the processing unit, wherein the sealing structure comprises:

a first casing;

a second casing disposed on the load board and assembled with the first casing such that a part of the optoelectronic transceiver module and the processing unit are arranged between the first casing and the second casing; and a sealing element disposed between the first casing and the second casing, and wherein the optoelectronic transceiver module comprises a detachable optical coupling structure comprising:

a first connector disposed on the load board and comprising:

a base; and a waveguide device disposed in the base; and a second connector comprising an optical fiber assembly, wherein the second connector is detachably connected to the first connector.

17. The sealing structure for the optoelectronic transceiver device of claim 16, wherein at least a notch portion is arranged between peripheral portions of the first casing and the second casing, and the sealing element comprises at least a retaining block positioned in the notch portion and encompassing a part of the optical fiber assembly extending out of the notch portion.

18. A sealing structure for an optoelectronic transceiver device, the optoelectronic transceiver device comprising a main board, a load board disposed on the main board, a processing unit disposed on the load board, and at least an optical fiber assembly connected to the processing unit, the sealing structure comprising:

a first casing comprising a first frame portion;

a second casing comprising a second frame portion and being disposed on the load board and assembled with the first casing such that a part of the optical fiber assembly and the processing unit are arranged between the first casing and the second casing, wherein at least a notch portion is arranged between peripheral portions of the first casing and the second casing; and a sealing element comprising at least a retaining block positioned in the notch portion and encompassing a part of the optical fiber assembly extending out of the notch portion;

wherein the notch portion is positioned between the first frame portion and the second frame portion, and the first frame portion and the second frame portion are soldered or welded along junctions of the first casing and the second casing and boundaries between the first casing, the second casing, and the retaining block such that the first casing and the second casing are secured together and the retaining block is in an airtight arrangement with the first casing and the second casing.

19. The sealing structure for the optoelectronic transceiver device of claim 18, wherein the notch portion comprises a first notch and a second notch, the first notch is disposed on the first casing, the second notch is disposed on the second casing and corresponding to the first notch, and the retaining block is positioned between the first notch and the second notch.

20. A sealing structure for an optoelectronic transceiver device, the optoelectronic transceiver device comprising a main board, a load board disposed on the main board, a processing unit disposed on the load board, and at least an optical fiber assembly connected to the processing unit, the sealing structure comprising:

a first casing;

a second casing disposed on the load board and assembled with the first casing such that a part of the optical fiber assembly and the processing unit are arranged between the first casing and the second casing, wherein at least a notch portion is arranged between peripheral portions of the first casing and the second casing; and a sealing element comprising at least a retaining block positioned in the notch portion and encompassing a part of the optical fiber assembly extending out of the notch portion;

wherein the retaining block comprises an alloy body, a metal coating layer, and capping elements, wherein the metal coating layer completely covers the part of the optical fiber assembly, the alloy body bonds the metal coating layer with the part of the optical fiber assembly, and the capping elements seals opposite ends of the alloy body.

21. The sealing structure for the optoelectronic transceiver device of claim 20, wherein the notch portion comprises a first notch and a second notch, the first notch is disposed on the first casing, the second notch is disposed on the second casing and corresponding to the first notch, and the retaining block is positioned between the first notch and the second notch.

* * * * *